(12) United States Patent
Fujimoto et al.

(10) Patent No.: US 7,728,046 B2
(45) Date of Patent: Jun. 1, 2010

(54) PROCESS FOR PRODUCING LIQUEFIED PETROLEUM GAS

(75) Inventors: Kaoru Fujimoto, Kitakyushu (JP); Kenji Asami, Kitakyushu (JP); Sachio Asaoka, Kitakyushu (JP); Xiaohong Li, Kitakyushu (JP)

(73) Assignee: Japan Gas Synthesize, Ltd., Tokyo (JP)

( * ) Notice: Subject to any disclaimer, the term of this patent is extended or adjusted under 35 U.S.C. 154(b) by 407 days.

(21) Appl. No.: 11/573,243

(22) PCT Filed: Aug. 9, 2005

(86) PCT No.: PCT/JP2005/014589

§ 371 (c)(1),
(2), (4) Date: Nov. 15, 2007

(87) PCT Pub. No.: WO2006/016587

PCT Pub. Date: Feb. 16, 2006

(65) Prior Publication Data

US 2008/0300327 A1 Dec. 4, 2008

(30) Foreign Application Priority Data

Aug. 11, 2004 (JP) .............................. 2004-234518

(51) Int. Cl.
*C07C 27/00* (2006.01)
*C07C 1/00* (2006.01)

(52) U.S. Cl. ................. 518/700; 518/702; 518/711; 585/310

(58) Field of Classification Search ................. 518/700, 518/702, 711; 585/310
See application file for complete search history.

(56) References Cited

U.S. PATENT DOCUMENTS 7,297,825 B2 * 11/2007 Fujimoto et al. ............ 585/310

\* cited by examiner

*Primary Examiner*—Jafar Parsa
(74) *Attorney, Agent, or Firm*—Knobbe Martens Olson & Bear LLP (57) ABSTRACT

A synthesis gas is produced from a carbon-containing starting material such as a coal; a CO-containing gas is separated from the resultant synthesis gas, whereby obtaining a gas containing carbon monoxide and hydrogen; a methanol- and/or dimethyl ether-containing gas is produced from the resultant gas containing carbon monoxide and hydrogen; meanwhile, a $H_2$-containing gas is produced from the CO-containing gas and the $H_2O$-containing gas separated from the lower-paraffin-containing gas by a shift reaction; a lower-paraffin-containing gas containing propane or butane as a main component of hydrocarbons contained therein is produced from the methanol- and/or dimethyl ether-containing gas and the $H_2$-containing gas; and a $H_2O$-containing gas is separated from the resultant lower-paraffin-containing gas, whereby obtaining a liquefied petroleum gas.

9 Claims, 1 Drawing Sheet

Fig.1

PROCESS FOR PRODUCING LIQUEFIED PETROLEUM GAS

This application is the U.S. National Phase under 35 U.S.C. 371 of International Application PCT/JP2005/014589, filed Aug. 9, 2005, which claims priority to Japanese Patent Application No. 2004-234518, filed Aug. 11, 2004. The International Application was published under PCT Article 21(2) in a language other than English.

TECHNICAL FIELD

This invention relates to a process for producing a liquefied petroleum gas containing propane or butane as a main component from a carbon-containing starting material such as a coal, via a synthesis gas, and methanol and/or dimethyl ether.

BACKGROUND ART

Liquefied petroleum gas (LPG) is a liquefied petroleum-based or natural-gas-based hydrocarbon which is gaseous at an ambient temperature under an atmospheric pressure by compression while optionally cooling, and the main component of it is propane or butane. LPG is advantageously transportable because it can be stored or transported in a liquid form. Thus, in contrast with a natural gas that requires a pipeline for supply, it has a characteristic that it can be filled in a container to be supplied to any place. For that reason, LPG comprising propane as a main component, i.e., propane gas has been widely used as a fuel for household and business use. At present, propane gas is supplied to about 25 million households (more than 50% of the total households) in Japan. In addition to household and business use, LPG is used as a fuel for a portable product such as a portable gas burner and a disposable lighter (mainly, butane gas), an industrial fuel and an automobile fuel.

Conventionally, LPG has been produced by 1) collection from a wet natural gas, 2) collection from a stabilization (vapor-pressure regulating) process of crude petroleum, 3) separation and extraction of a product in, for example, a petroleum refining process, or the like.

LPG, in particular propane gas used as a household/business fuel, can be expected to be in great demand in the future. Thus, it may be very useful to establish an industrially practicable and new process for producing LPG.

As a process for producing LPG, Patent document 1 discloses that a synthesis gas consisting of hydrogen and carbon monoxide is reacted in the presence of a mixed catalyst obtained by physically mixing a methanol synthesis catalyst such as a Cu—Zn-based catalyst, a Cr—Zn-based catalyst and a Pd-based catalyst, specifically a CuO—ZnO—$Al_2O_3$ catalyst or a $Pd/SiO_2$ catalyst with a methanol conversion catalyst composed of a zeolite having an average pore size of about 10 Å (1 nm) or more, specifically a Y-type zeolite, to give a liquefied petroleum gas or a mixture of hydrocarbons similar in composition to LPG.

Furthermore, as a process for producing LPG, Non-patent document 1 discloses that, using a hybrid catalyst consisting of a methanol synthesis catalyst such as a 4 wt % $Pd/SiO_2$, a Cu—Zn—Al mixed oxide {Cu:Zn:Al=40:23:37 (atomic ratio)} or a Cu-based low-pressure methanol synthesis catalyst (Trade name: BASF S3-85) and a high-silica Y-type zeolite with $SiO_2/Al_2O_3$=7.6 treated with steam at 450° C. for 1 hour, C2 to C4 paraffins can be produced in a selectivity of 69 to 85% via methanol and dimethyl ether from a synthesis gas.

On the other hand, Non-patent document 2 discloses a process for producing LPG, using at least one selected from the group consisting of methanol and dimethyl ether as a starting material. Specifically, a starting gas, whose composition is methanol:$H_2$:$N_2$=1:1:1, was passed through the two-layered catalyst layer consisting of ZSM-5 as the former layer and Pt—C as the latter layer (ZSM-5/Pt—C Series) or a mixed catalyst layer consisting of ZSM-5 and Pt—C (ZSM-5/Pt—C Pellet-mixture), under a slightly increased pressure, at a reaction temperature of 603 K (330° C.) and at a methanol-based LHSV of 20 $h^{-1}$, to carry out an LPG production reaction.

LIST OF REFERENCES

Patent document 1: Japanese Patent Laid-open Publication No. 61-23688;
Non-patent document 1: "Selective Synthesis of LPG from Synthesis Gas", Kaoru Fujimoto et al., Bull. Chem. Soc. Jpn., 58, p. 3059-3060 (1985);
Non-patent document 2: "Methanol/Dimethyl Ether Conversion on Zeolite Catalysts for Indirect Synthesis of LPG from Natural Gas", Yingjie Jin et al., Dai 92 Kai Shokubai Touronkai TouronkaiA Yokousyuu, (the summaries of the 92th Catalysis Society of Japan (CatSJ) Meeting, Meeting-A), p. 322, Sep. 18, 2003.

DISCLOSURE OF THE INVENTION

Problems to be Solved by the Invention

An objective of this invention is to provide a process for economically producing a hydrocarbon containing propane or butane as a main component, i.e., a liquefied petroleum gas (LPG) from a carbon-containing starting material such as a coal, via a synthesis gas, and methanol and/or dimethyl ether.

Means for Solving the Problems

The present invention provides a process for producing a liquefied petroleum gas, comprising:

(i) a step of producing a synthesis gas wherein a synthesis gas, which contains carbon monoxide and hydrogen, is produced from a carbon-containing starting material and at least one selected from the group consisting of $H_2O$, $O_2$ and $CO_2$;

(ii) a step of separating CO wherein a CO-containing gas, which contains carbon monoxide as a main component, and a gas for producing methanol and/or dimethyl ether, which contains carbon monoxide and hydrogen, are separated from the synthesis gas obtained in the step of producing a synthesis gas;

(iii) a step of conducting a shift reaction wherein a $H_2$-containing gas, which contains hydrogen, is produced from the CO-containing gas separated in the step of separating CO and the $H_2O$-containing gas recycled from the step of recycling by a shift reaction;

(iv) a step of producing methanol and/or dimethyl ether wherein a methanol- and/or dimethyl ether-containing gas, which contains at least one selected from the group consisting of methanol and dimethyl ether, is produced from the gas for producing methanol and/or dimethyl ether obtained in the step of separating CO by reacting carbon monoxide with hydrogen in the presence of a catalyst;

(v) a step of producing a lower-paraffin wherein a lower-paraffin-containing gas, which contains propane or butane as a main component of hydrocarbons contained therein, and water, is produced from the methanol- and/or dimethyl ether-containing gas obtained in the step of producing methanol and/or dimethyl ether and the $H_2$-containing gas obtained in the step of conducting a shift reaction by reacting at least one selected from the group consisting of methanol and dimethyl ether with hydrogen in the presence of a catalyst for producing a liquefied petroleum gas;

(vi) a step of separating $H_2O$ wherein a $H_2O$-containing gas, which contains water as a main component, and a liquefied petroleum gas, which contains propane or butane as a main component, are separated from the lower-paraffin-containing gas obtained in the step of producing a lower-paraffin; and (vii) a step of recycling wherein the $H_2O$-containing gas separated in the step of separating $H_2O$ is recycled to the step of conducting a shift reaction.

Furthermore, the present invention provides a process for producing a liquefied petroleum gas, comprising:

(i) a step of producing a synthesis gas wherein a synthesis gas, which contains carbon monoxide and hydrogen, is produced from a carbon-containing starting material and at least one selected from the group consisting of $H_2O$, $O_2$ and $CO_2$;

(ii) a step of separating CO wherein a CO-containing gas, which contains carbon monoxide as a main component, and a gas for producing methanol, which contains carbon monoxide and hydrogen, are separated from the synthesis gas obtained in the step of producing a synthesis gas;

(iii) a step of conducting a shift reaction wherein a $H_2$-containing gas, which contains hydrogen, is produced from the CO-containing gas separated in the step of separating CO and the $H_2O$-containing gas recycled from the step of recycling by a shift reaction;

(iv) a step of producing methanol wherein a methanol-containing gas is produced from the gas for producing methanol obtained in the step of separating CO by reacting carbon monoxide with hydrogen in the presence of a catalyst for producing methanol;

(v) a step of producing a lower-paraffin wherein a lower-paraffin-containing gas, which contains propane or butane as a main component of hydrocarbons contained therein, and water, is produced from the methanol-containing gas obtained in the step of producing methanol and the $H_2$-containing gas obtained in the step of conducting a shift reaction by reacting methanol with hydrogen in the presence of a catalyst for producing a liquefied petroleum gas;

(vi) a step of separating $H_2O$ wherein a $H_2O$-containing gas, which contains water as a main component, and a liquefied petroleum gas, which contains propane or butane as a main component, are separated from the lower-paraffin-containing gas obtained in the step of producing a lower-paraffin; and (vii) a step of recycling wherein the $H_2O$-containing gas separated in the step of separating $H_2O$ is recycled to the step of conducting a shift reaction.

Furthermore, the present invention provides a process for producing a liquefied petroleum gas, comprising:

(i) a step of producing a synthesis gas wherein a synthesis gas, which contains carbon monoxide and hydrogen, is produced from a carbon-containing starting material and at least one selected from the group consisting of $H_2O$, $O_2$ and $CO_2$;

(ii) a step of separating CO wherein a CO-containing gas, which contains carbon monoxide as a main component, and a gas for producing dimethyl ether, which contains carbon monoxide and hydrogen, are separated from the synthesis gas obtained in the step of producing a synthesis gas;

(iii) a step of conducting a shift reaction wherein a $H_2$-containing gas, which contains hydrogen, is produced from the CO-containing gas separated in the step of separating CO and the $H_2O$-containing gas recycled from the step of recycling by a shift reaction;

(iv) a step of producing dimethyl ether wherein a dimethyl ether-containing gas is produced from the gas for producing dimethyl ether obtained in the step of separating CO by reacting carbon monoxide with hydrogen in the presence of a catalyst for producing dimethyl ether;

(v) a step of producing a lower-paraffin wherein a lower-paraffin-containing gas, which contains propane or butane as a main component of hydrocarbons contained therein, and water, is produced from the dimethyl ether-containing gas obtained in the step of producing dimethyl ether and the $H_2$-containing gas obtained in the step of conducting a shift reaction by reacting dimethyl ether with hydrogen in the presence of a catalyst for producing a liquefied petroleum gas;

(vi) a step of separating $H_2O$ wherein a $H_2O$-containing gas, which contains water as a main component, and a liquefied petroleum gas, which contains propane or butane as a main component, are separated from the lower-paraffin-containing gas obtained in the step of producing a lower-paraffin; and (vii) a step of recycling wherein the $H_2O$-containing gas separated in the step of separating $H_2O$ is recycled to the step of conducting a shift reaction.

Herein, the term "synthesis gas" refers to a mixed gas comprising hydrogen and carbon monoxide, and is not limited to a mixed gas consisting of hydrogen and carbon monoxide. A synthesis gas may comprise, for example, carbon dioxide, water, methane, ethane, ethylene and the like.

Effect of the Invention

A hydrocarbon gas containing propane or butane as a main component, i.e., a liquefied petroleum gas (LPG) can be produced by reacting at least one selected from the group consisting of methanol and dimethyl ether with hydrogen. Both of methanol and dimethyl ether, which are reaction raw materials, can be produced from a synthesis gas, which is a mixed gas comprising hydrogen and carbon monoxide. A synthesis gas can be produced by reacting a carbon-containing starting material such as a natural gas, a coal, a biomass, and the like, with at least one selected from the group consisting of $H_2O$, $O_2$ and $CO_2$.

Therefore, LPG can be produced from a carbon-containing starting material such as a natural gas, a coal, a biomass, and the like, via a synthesis gas, and methanol and/or dimethyl ether.

According to this invention, LPG can be more economically produced from a carbon-containing starting material such as a coal and a biomass.

In this invention, a hydrocarbon containing propane or butane as a main component, i.e., LPG may be produced from at least one selected from the group consisting of methanol and dimethyl ether, and hydrogen, following the formula (1) shown below.

In this invention, firstly, methanol is dehydrated to generate a carbene ($H_2C$:). And then, the carbene is polymerized to form an olefin containing propylene or butene as a main component. In the olefin formation process, there would occur other reactions such as formation of dimethyl ether by dehydration-dimerization of methanol and formation of methanol by hydration of dimethyl ether. And then, the formed olefin is hydrogenated to form a paraffin containing propane or butane as a main component, i.e., LPG.

As illustrated in the above formula (1), water generates as a by-product in the reaction of hydrogen and at least one selected from the group consisting of methanol and dimethyl ether to yield LPG.

On the other hand, as illustrated in the following formula (2), water may react with carbon monoxide to form hydrogen. The reaction represented by the following formula (2) is referred to as a shift reaction.

$$CO + H_2O \rightleftarrows CO_2 + H_2 \qquad (2)$$

A reaction product gas of the shift reaction containing hydrogen (a $H_2$-containing gas) generally contains carbon monoxide and/or carbon dioxide, in addition to hydrogen.

According to this invention, carbon monoxide is separated from a synthesis gas having a relatively high ratio of carbon monoxide to hydrogen ($CO/H_2$) which is produced from a coal or a biomass, for example. Coal is inexpensive, and coal reserves are expected to be sufficiently large. And then, a $H_2$-containing gas is produced by a shift reaction from carbon monoxide which is separated from the synthesis gas, and water which generates as a by-product in the LPG synthesis reaction. The $H_2$-containing gas thus obtained is used as the source of hydrogen for LPG synthesis reaction. Thus the compositions of raw material gases for methanol and/or dimethyl ether synthesis and for LPG synthesis may be optimized, and an excessive amount of carbon monoxide in the synthesis gas, and water, which is a by-product in the LPG synthesis reaction, may be effectively used. Consequently, according to this invention, LPG can be more economically.

On the other hand, the following process may be also considered as a process for producing LPG: an olefin containing propylene or butene as a main component is produced from at least one selected from the group consisting of methanol and dimethyl ether, using a zeolite catalyst; and then the olefin produced is hydrogenated, using an olefin-hydrogenation catalyst, to form a paraffin containing propane or butane as a main component, i.e., LPG.

In the above process for producing LPG comprising two reaction steps, however, a gas containing carbon monoxide and/or carbon dioxide is not preferable as a starting gas (a gas fed into a reactor). When a starting gas contains carbon monoxide and/or carbon dioxide, in the second step of olefin hydrogenation, carbon monoxide and carbon dioxide may act as a catalyst poisoning component, and the formation of methane by hydrogenation may occur. For this reason, the $H_2$-containing gas obtained by a shift reaction represented by the above formula (2) cannot be used as the source of hydrogen for LPG synthesis reaction in the above process for producing LPG comprising two reaction steps: the synthesis reaction of an olefin from methanol and/or dimethyl ether, and the hydrogenation reaction of an olefin into a paraffin.

In contrast, according to the process for producing LPG of this invention, wherein LPG is produced in one step from methanol and/or dimethyl ether, when a starting gas for LPG production contained carbon monoxide and/or carbon dioxide, the presence of carbon monoxide and/or carbon dioxide in the starting gas had no effect on LPG production. Therefore, in the process for producing LPG according to this invention, the $H_2$-containing gas obtained by a shift reaction represented by the above formula (2) can be used as the source of hydrogen for LPG synthesis reaction.

In addition, as illustrated in the following formula (3), a preferable composition of a synthesis gas is $H_2/CO$ (molar ratio)=2 in terms of the stoichiometry for methanol production.

$$CO + 2H_2 \rightarrow CH_3OH \qquad (3)$$

In this invention, when LPG is produced via methanol mainly, a synthesis gas containing carbon monoxide and hydrogen at a ratio of $CO:H_2=1:1.5$ to $1:2.5$ (molar ratio) is preferably used as a starting gas for methanol synthesis reaction. By adjusting a composition of a synthesis gas within the above range, methanol can be produced more efficiently and more economically, resulting in more economical production of an LPG.

As illustrated in the following formula (4), a preferable composition of a synthesis gas is $H_2/CO$ (molar ratio)=1 in terms of the stoichiometry for dimethyl ether production.

$$3CO + 3H_2 \rightarrow CH_3OCH_3 + CO_2 \qquad (4)$$

In this invention, when LPG is produced via dimethyl ether mainly, a synthesis gas containing carbon monoxide and hydrogen at a ratio of $CO:H_2=1:0.5$ to $1:1.5$ (molar ratio) is preferably used as a starting gas for dimethyl ether synthesis reaction. By adjusting a composition of a synthesis gas within the above range, dimethyl ether can be produced more efficiently and more economically, resulting in more economical production of an LPG.

Furthermore, in this invention, when LPG is produced via methanol mainly, a raw material gas containing methanol and hydrogen at a ratio of $CH_3OH:H_2=1:1$ to $1:3$ (molar ratio) is preferably used as a starting gas for LPG synthesis reaction. By adjusting a composition of a raw material gas within the above range, LPG can be produced more efficiently and more economically.

Furthermore, in this invention, when LPG is produced via dimethyl ether mainly, a raw material gas containing dimethyl ether and hydrogen at a ratio of $CH_3OCH_3:H_2=1:2$ to $1:5$ (molar ratio) is preferably used as a starting gas for LPG synthesis reaction. By adjusting a composition of a raw material gas within the above range, LPG can be produced more efficiently and more economically.

As described above, according to this invention, a hydrocarbon containing propane or butane as a main component, i.e., a liquefied petroleum gas (LPG) can be economically produced from a carbon-containing starting material such as a coal and a biomass, via a synthesis gas, and methanol and/or dimethyl ether.

DESCRIPTION OF THE MAIN SYMBOLS

11: a gasification reactor
12: a first separator
13: a shift-reaction reactor
13a: a shift catalyst
14: a reactor for producing methanol and/or dimethyl ether
14a: a catalyst for producing methanol and/or dimethyl ether
15: a reactor for producing a liquefied petroleum gas 15a: a catalyst for producing a liquefied petroleum gas
16: a second separator
101, 102, 103, 104, 105, 106, 107, 108, 109: lines.

BEST MODE FOR CARRYING OUT THE INVENTION

Figure 1:
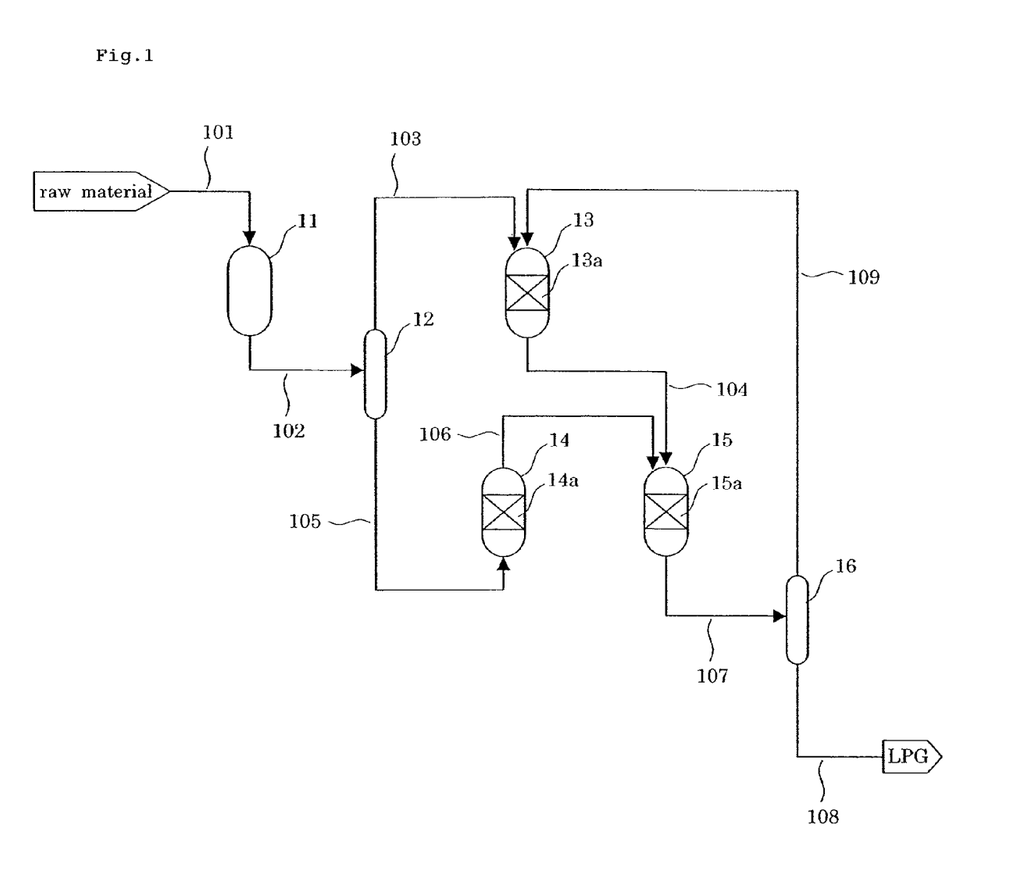
FIG. 1 is a process flow diagram showing a main configuration in an example of an LPG producing apparatus suitable for conducting the process for LPG production according to this invention.

There will be described an embodiment of a process for producing LPG according to this invention with reference to the drawing.

FIG. 1 shows an embodiment of an LPG production apparatus suitable for carrying out a production process for LPG according to this invention.

First, a coal as a carbon-containing starting material is fed into a gasification reactor 11 via a line 101. In addition, oxygen and steam are also fed into the line 101 (not shown). The gasification reactor 11 also has a heating means for supplying heat required for reforming (not shown). In the gasification reactor 11, a coal is partially oxidized to form a synthesis gas containing hydrogen and carbon monoxide.

The synthesis gas thus produced is fed into a first separator 12 via a line 102. In the separator 12, the synthesis gas is separated into a CO-containing gas which contains carbon monoxide as a main component, and a gas for producing methanol and/or dimethyl ether which has the composition suitable for methanol and/or dimethyl ether synthesis.

The separated CO-containing gas is fed into a shift-reaction reactor 13 via a line 103. In addition, a $H_2O$-containing gas recycled is fed into the shift-reaction reactor 13 from a second separator 16 via a line 109. In the reactor 13, there is a shift catalyst 13a. In the reactor 13, a $H_2$-containing gas is produced from the CO-containing gas and the $H_2O$-containing gas by a shift reaction in the presence of the shift catalyst.

Meanwhile, the gas for producing methanol and/or dimethyl ether is fed into a reactor for producing methanol and/or dimethyl ether 14 via a line 105. In the reactor 14, there is a catalyst for producing methanol and/or dimethyl ether (a catalyst for producing methanol or a catalyst for producing dimethyl ether) 14a. In the reactor 14, a methanol- and/or dimethyl ether-containing gas is produced from the gas for producing methanol and/or dimethyl ether in the presence of the catalyst for producing methanol and/or dimethyl ether.

The methanol- and/or dimethyl ether-containing gas thus produced is fed into a reactor for producing a liquefied petroleum gas 15 via a line 106, if necessary, after removing water by gas-liquid separation, for example. In addition, the $H_2$-containing gas is fed into the reactor for producing a liquefied petroleum gas 15 from the shift-reaction reactor 13 via a line 104. In the reactor 15, there is a catalyst for producing a liquefied petroleum gas 15a. In the reactor 15, a hydrocarbon gas containing propane or butane as a main component (a lower-paraffin-containing gas) is produced from the methanol- and/or dimethyl ether-containing gas and the $H_2$-containing gas in the presence of the catalyst for producing a liquefied petroleum gas. The lower-paraffin-containing gas thus produced contains water, in addition to hydrocarbons.

The lower-paraffin-containing gas thus produced is fed into the second separator 16 via a line 107. In the separator 16, a $H_2O$-containing gas which contains water as a main component, is separated from the lower-paraffin-containing gas.

The separated $H_2O$-containing gas is recycled into the shift-reaction reactor 13 via a line 109.

Meanwhile, the lower-paraffin-containing gas from which the $H_2O$-containing gas is separated is pressurized and cooled, after optional removal of a low-boiling component including hydrogen, and a high-boiling component, and LPG, which is a product, is obtained from a line 108.

The LPG production apparatus may be, as necessary, provided with a booster, a heat exchanger, a valve, an instrumentation controller and so on, which are not shown.

<Synthesis Gas Production Process>

In a synthesis gas production process, a synthesis gas is produced from a carbon-containing starting material and at least one selected from the group consisting of $H_2O$, $O_2$ and $CO_2$. The synthesis gas produced in the synthesis gas production process may have a higher ratio of carbon monoxide to hydrogen ($CO/H_2$) than the gas for producing methanol and/or dimethyl ether, which is used as the starting gas for the following step of producing methanol and/or dimethyl ether.

A carbon-containing substance which can react with at least one selected from the group consisting of $H_2O$, $O_2$ and $CO_2$ to form $H_2$ and CO, can be used as a carbon-containing starting material. A substance known as a raw material for a synthesis gas can be used as a carbon-containing starting material; for example, lower hydrocarbons such as methane and ethane, a natural gas, a naphtha, a coal, a biomass, and the like can be used.

Since a catalyst is generally used in a synthesis gas production process, a methanol and/or dimethyl ether production process, and a liquefied petroleum gas production process in this inventions a carbon-containing starting material (a natural gas, a naphtha, a coal and so on) preferably contains less catalyst poisoning components such as sulfur and a sulfur compound. When a carbon-containing starting material contains a catalyst poisoning component, a step of removing the catalyst poisoning component such as devulcanization can be conducted before a synthesis gas production process, if necessary.

A synthesis gas can be produced by reacting the above carbon-containing starting material with at least one selected from the group consisting of $H_2O$, $O_2$ and $CO_2$, if necessary, using a catalyst for producing a synthesis gas (reforming catalyst). In this invention, a synthesis gas may be preferably produced, for example, by coal gasification or biomass gasification because it is preferable to produce a synthesis gas having a relatively high ratio of carbon monoxide to hydrogen ($CO/H_2$).

A synthesis gas can be produced by coal gasification or biomass gasification in accordance with a known method.

For example, a synthesis gas can be produced by the following method of coal gasification.

First, coal is crushed down to pulverized coal, which is then mixed with water to prepare a slurry containing coal and water. Then, the resulting slurry is fed into a reactor (gasification reactor). The pulverized coal may be fed into a reactor after mixed with high-pressure nitrogen gas. In addition, oxygen is also fed into the reactor. A molar ratio of carbon (C) to oxygen (O) may be, for example, 0.8 to 1. And then, the coal-water slurry and oxygen are reacted at a high temperature of 1000° C. or higher and under a high pressure of 2 MPa or higher, for example, at a reactor outlet temperature of 1000 to 1500° C. and under a reactor outlet pressure of 2 to 8 MPa, to form a synthesis gas. The reaction conditions such as a reaction temperature, a pressure, an oxygen usage and a water usage may be appropriately determined, depending on the nature of the coal as a raw material, and the like.

Alternatively, the pulverized coal may be partially oxidized by combustion to form coke, which is then contact-reacted with steam at a high temperature, to form a synthesis gas.

If necessary, a catalyst poisoning component such as a sulfur-containing material (sulfur and a sulfur compound) derived from the coal may be removed from the synthesis gas thus produced by a known method including absorption separation. Furthermore, solid fine particles may be separated or filtered off, if necessary.

Alternatively, a synthesis gas can be produced by the following method of biomass gasification, for example.

First, biomass for combustion and oxygen are fed into a combustion chamber, in which the biomass for combustion is ignited to burn. Steam may be fed into the combustion chamber, simultaneously. The combustion gas generated by the combustion of biomass for combustion is fed into a gasification chamber, while being kept at the given temperature (e.g. 800 to 1100° C.) and the given heat quantity. The feed rate and the feed pressure of the combustion gas may be appropriately determined, depending on the nature of the biomass for gasification, and the like. In addition, biomass for gasification is also fed into the gasification chamber. In the gasification chamber, the biomass for gasification is fluidized and gasified (thermal cracking) by the combustion gas containing steam, to form a synthesis gas. The temperature in the gasification chamber may be 700 to 1000° C., for example.

<CO Separation Process>

In the CO separation process, a CO-containing gas, which contains carbon monoxide as a main component, and a gas for producing methanol and/or dimethyl ether, which contains carbon monoxide and hydrogen, are separated from the synthesis gas obtained in the above synthesis gas production process.

Another component may be separated from the synthesis gas or the gas for producing methanol and/or dimethyl ether, as necessary, before or after separating the CO-containing gas. A component other than carbon monoxide may be also separated from the CO-containing gas which is separated from the synthesis gas, as necessary.

The CO-containing gas may contain a component other than carbon monoxide, for example, carbon dioxide, water, and hydrogen.

Separation of the CO-containing gas can be conducted in accordance with a known method. The CO-containing gas can be separated by, for example, membrane separation using an organic separation membrane such as a crosslinked polydimethyl siloxane membrane, a porous polysulfone membrane and a polyglutaric acid membrane, and a metallic membrane such as palladium, tantalum, niobium and vanadium, and alloys thereof.

The separation conditions may be determined as appropriate in accordance with a known method.

When methanol is produced mainly in the methanol-dimethyl ether production process described later, a preferable composition of a gas for producing methanol and/or dimethyl ether (a gas for producing methanol) obtained from a CO separation process is $CO:H_2$ 1:1.5 to 1:2.5 (molar ratio). A ratio of hydrogen to carbon monoxide ($H_2/CO$; by mole) in a gas for producing methanol and/or dimethyl ether obtained is preferably 1.8 or more, more preferably 1.9 or more. A ratio of hydrogen to carbon monoxide ($H_2/CO$; by mole) in a gas for producing methanol and/or dimethyl ether obtained is preferably 2.3 or less, more preferably 2.2 or less.

By adjusting a composition of a gas for producing methanol and/or dimethyl ether obtained within the above range, methanol can be produced more efficiently and more economically in the methanol-dimethyl ether production process (methanol production process), resulting in more economical production of an LPG.

When dimethyl ether is produced mainly in the methanol-dimethyl ether production process described later, a preferable composition of a gas for producing methanol and/or dimethyl ether (a gas for producing dimethyl ether) obtained from a CO separation process is $CO:H_2$=1:0.5 to 1:1.5 (molar ratio). A ratio of hydrogen to carbon monoxide ($H_2/CO$; by mole) in a gas for producing methanol and/or dimethyl ether obtained is preferably 0.8 or more, more preferably 0.9 or more. A ratio of hydrogen to carbon monoxide ($H_2/CO$; by mole) in a gas for producing methanol and/or dimethyl ether obtained is preferably 1.2 or less, more preferably 1.1 or less.

By adjusting a composition of a gas for producing methanol and/or dimethyl ether obtained within the above range, dimethyl ether can be produced more efficiently and more economically in the methanol-dimethyl ether production process (dimethyl ether production process), resulting in more economical production of an LPG.

<Shift Reaction Process>

In the shift reaction process, a $H_2$-containing gas is produced from the CO-containing gas separated from the synthesis gas in the above CO separation process and the $H_2O$-containing gas separated from the lower-paraffin-containing gas in the $H_2O$ separation process described later, by a shift reaction.

In the shift reaction process, it is necessary to obtain the required or suitable amount of hydrogen for LPG synthesis reaction (the synthesis reaction of a lower-paraffin such as propane and butane from hydrogen and methanol and/or dimethyl ether) in the lower-paraffin production process described later. It is not necessary to use the whole of CO-containing gas separated in the above CO separation process and/or the whole of $H_2O$-containing gas separated in the $H_2O$ separation process described later. Part of the CO-containing gas and/or the $H_2O$-containing gas may be removed outside the system, or may be recycled to the synthesis gas production process.

The ratio of the $H_2O$-containing gas to the CO-containing gas may be appropriately determined, depending on a composition of a CO-containing gas, a composition of a $H_2O$-containing gas, and the like.

A shift reaction ($CO+H_2O \rightarrow CO_2+H_2$) can be conducted in accordance with a known method. For example, a $H_2$-containing gas can be produced from the CO-containing gas and the $H_2O$-containing gas by reacting carbon monoxide with water according to the following method.

A shift reaction may be carried out in the presence of a shift catalyst at a reaction temperature of about 200 to 700° C., a reaction pressure of an atmospheric pressure to about 10 MPa, and a SV of about 300 to 4000 $h^{-1}$.

Examples of a shift catalyst include a $Fe_2O_3$-based catalyst, a CuO/ZnO-based catalyst, and a noble-metal-based catalyst. These shift catalysts may be a catalyst in which a catalyst metal is supported on a support. Examples of a support include basic supports such as magnesia, magnesia-calcium oxide-silica and magnesia-silica; neutral supports such as alumina; and acidic supports such as alumina-silica and silica. Examples of a catalyst metal include Fe, Cu, Zn, Pt and Au. The amount of the supported catalyst metal may be, for example, about 0.1 to 20% relative to the whole of the catalyst. A $Fe_2O_3$-based catalyst may comprise an alkali metal oxide such as $K_2O$, and chromium oxide.

A reaction temperature may vary depending on a kind of a shift catalyst to be used, and is generally about 200 to 700° C. When using a $Fe_2O_3$-based catalyst in which $K_2O$ is added to $Fe_2O_3$, a preferable reaction temperature is about 500 to 700°

C. When using a CuO/ZnO-based catalyst, a preferable reaction temperature is about 200 to 500° C.

The amount of water to be used in the shift reaction may be, for example, about 1 to 5 mole per 1 mole of carbon monoxide.

A shift reaction may be conducted in one step, or alternatively may be conducted in two steps: combination of a high-temperature shift reaction and a low-temperature shift reaction.

The $H_2$-containing gas obtained by a shift reaction generally comprises, in addition to hydrogen, carbon dioxide, carbon monoxide and water. A component other than hydrogen may be separated from the $H_2$-containing gas, as necessary. As described above, in this invention, when a gas fed into a reactor in a lower-paraffin production process contains carbon monoxide and/or carbon dioxide, the presence of carbon monoxide and/or carbon dioxide in the gas has no effect on LPG synthesis reaction. From this viewpoint, there is no need to separate carbon monoxide and/or carbon dioxide from the $H_2$-containing gas.

<Methanol-Dimethyl Ether Production Process>

In the methanol-dimethyl ether production process, a methanol- and/or dimethyl ether-containing gas, which contains at least one selected from the group consisting of methanol and dimethyl ether, is produced from the gas for producing methanol and/or dimethyl ether obtained in the above CO separation process, by reacting carbon monoxide with hydrogen in the presence of a catalyst. In one example of this process, first, a reaction product gas containing methanol as a main component is produced from the gas for producing methanol and/or dimethyl ether, and then, a reaction product gas containing dimethyl ether as a main component is produced from the reaction product gas containing methanol as a main component, for example, by dehydration reaction of methanol using a solid acid catalyst such as aluminum phosphate.

According to this invention, although a methanol- and/or dimethyl ether-containing gas, which contains a nearly equal amount of methanol and dimethyl ether, may be produced, a reaction product gas containing either methanol or dimethyl ether as a main component is often produced in this process.

Next, there will be described this process for producing methanol mainly from the gas for producing methanol and/or dimethyl ether (referred to as "Methanol production process") and process for producing dimethyl ether mainly from the gas for producing methanol and/or dimethyl ether (referred to as "Dimethyl ether production process").

<Methanol Production Process>

In the methanol production process, a methanol- and/or dimethyl ether-containing gas which contains methanol (referred to as "methanol-containing gas") is produced from the gas for producing methanol and/or dimethyl ether (referred to as "gas for producing methanol") obtained in the above CO separation process, by reacting carbon monoxide with hydrogen in the presence of a catalyst for producing methanol (methanol synthesis catalyst).

In this methanol production process, methanol synthesis reaction can be conducted in accordance with a known method. For example, a methanol-containing gas can be produced by reacting carbon monoxide with hydrogen in the presence of a catalyst for producing methanol according to the following method.

Methanol synthesis can be carried out by a vapor phase reaction, a liquid phase reaction in which a methanol synthesis catalyst is dispersed in an inert solvent, or the like. In the liquid phase reaction (slurry process), a petroleum solvent may be used as a solvent, and the amount of the methanol synthesis catalyst to be used may be, for example, about 25 to 50% by weight.

A fixed-bed contact synthesis reactor may be selected from, for example, a quench type reactor, a multitubular type reactor, a multistage type reactor, a multistage cooling radial flow type reactor, a double pipe heat exchange type reactor, an internal cooling coil type reactor, and a mixed flow type reactor.

Examples of a methanol synthesis catalyst include any of methanol synthesis catalysts known in the art; specifically, Cu—Zn-based catalysts such as copper oxide-zinc oxide, copper oxide-zinc oxide-aluminum oxide (alumina) and copper oxide-zinc oxide-chromium oxide; Zn—Cr-based catalysts such as zinc oxide-chromium oxide and zinc oxide-chromium oxide-alumina; and Cu—ZnO-based catalysts. An example of a methanol synthesis catalyst having a high durability under an atmosphere of relatively high concentration of carbon dioxide is an oxide containing Cu, Zn, Al, Ga and M (at least one element selected from alkaline earth metals and rare earth elements) at a ratio of Cu:Zn:Al:Ga:M=100:10-200:1-20:1-20:0.1-20 (atomic ratio).

The methanol synthesis catalyst may comprise an additive component as long as the intended effect would not be impaired.

A gas fed into a reactor preferably contains carbon monoxide and hydrogen at a ratio of $CO:H_2$=1:1.5 to 1:2.5 (molar ratio). A ratio of hydrogen to carbon monoxide ($H_2$/CO; by mole) in a gas fed into a reactor is more preferably 1.8 or more, particularly preferably 1.9 or more. A ratio of hydrogen to carbon monoxide ($H_2$/CO; by mole) in a gas fed into a reactor is more preferably 2.3 or less, particularly preferably 2.2 or less.

A gas fed into a reactor may contain a component other than carbon monoxide and hydrogen. In some cases, it is preferable that a gas fed into a reactor contains carbon dioxide. A content of carbon dioxide in a gas fed into a reactor may be 0.1 to 15 mol %, for example.

When using a Cu—Zn-based catalyst as a methanol synthesis catalyst, a reaction temperature may be about 200 to 300° C. and a reaction pressure may be about 1 to 10 MPa.

When using a Zn—Cr-based catalyst as a methanol synthesis catalyst, a reaction temperature may be about 250 to 400° C. and a reaction pressure may be about 10 to 60 MPa.

The reaction conditions such as a reaction temperature and a reaction pressure are not limited to the above ranges, and can be appropriately determined, depending on a kind of a catalyst to be used, and the like.

The methanol-containing gas thus produced generally comprises, in addition to methanol, carbon monoxide and hydrogen, which are unreacted starting materials, carbon dioxide, water, dimethyl ether and so on. A component other than methanol and dimethyl ether may be separated from the methanol-containing gas, as necessary. As described above, in this invention, when a gas fed into a reactor in a lower-paraffin production process contains carbon monoxide and/or carbon dioxide, the presence of carbon monoxide and/or carbon dioxide in the gas has no effect on LPG synthesis reaction. From this viewpoint, there is no need to separate carbon monoxide and/or carbon dioxide from the methanol-containing gas.

<Dimethyl Ether Production Process>

In the dimethyl ether production process, a methanol- and/ or dimethyl ether-containing gas which contains dimethyl ether (referred to as "dimethyl ether-containing gas") is produced from the gas for producing methanol and/or dimethyl ether (referred to as "gas for producing dimethyl ether") obtained in the above CO separation process, by reacting carbon monoxide with hydrogen in the presence of a catalyst for producing dimethyl ether (dimethyl ether synthesis catalyst).

A gas fed into a reactor in a dimethyl ether production process may be a gas obtained by separating a component other than carbon monoxide from the synthesis gas in the CO separation process. Generally, in addition to carbon monoxide, water is separated from the synthesis gas by a known method such as gas-liquid separation with cooling, and then carbon dioxide is separated from the resulting gas by a known method such as gas-liquid separation with cooling, absorption separation by an amine and the like, and then the resulting gas is fed into the reactor.

In this dimethyl ether production process, dimethyl ether synthesis reaction can be conducted in accordance with a known method. For example, a dimethyl ether-containing gas can be produced by reacting carbon monoxide with hydrogen in the presence of a catalyst for producing dimethyl ether according to the following method.

A dimethyl ether synthesis reaction can be conducted in various types of reactors such as a fixed-bed type reactor, a fluidized-bed type reactor and a slurry-bed type reactor, and is generally preferably conducted in a slurry-bed type reactor. When using a slurry type reactor, the temperature in the reactor is more uniform and the production amount of the by-product(s) is reduced.

Examples of a dimethyl ether synthesis catalyst include a catalyst comprising at least one methanol synthesis catalyst component and at least one methanol dehydration catalyst component, and a catalyst comprising at least one methanol synthesis catalyst component, at least one methanol dehydration catalyst component and at least one water gas shift catalyst component.

Herein, a "methanol synthesis catalyst component" means a compound which can act as a catalyst in the reaction of $CO+2H_2 \rightarrow CH_3OH$. And a "methanol dehydration catalyst component" means a compound which can act as a catalyst in the reaction of $2CH_3OH \rightarrow CH_3OCH_3+H_2O$. And a "water gas shift catalyst component" means a compound which can act as a catalyst in the reaction of $CO+H_2O \rightarrow H_2+CO_2$.

Examples of a methanol synthesis catalyst component include any of known methanol synthesis catalysts; specifically, copper oxide-zinc oxide, zinc oxide-chromium oxide, copper oxide-zinc oxide-chromium oxide, copper oxide-zinc oxide-alumina, and zinc oxide-chromium oxide-alumina. In a copper oxide-zinc oxide catalyst and a copper oxide-zinc oxide-alumina catalyst, a ratio of zinc oxide to copper oxide (zinc oxide/copper oxide; by weight) is about 0.05 to 20, more preferably about 0.1 to 5, and a ratio of alumina to copper oxide (alumina/copper oxide; by weight) is about 0 to 2, more preferably about 0 to 1. In a zinc oxide-chromium oxide catalyst and a zinc oxide-chromium oxide-alumina catalyst, a ratio of chromium oxide to zinc oxide (chromium oxide/zinc oxide; by weight) is about 0.1 to 10, more preferably about 0.5 to 5, and a ratio of alumina to zinc oxide (alumina/zinc oxide; by weight) is about 0 to 2, more preferably about 0 to 1.

Generally, a methanol synthesis catalyst component can act as a catalyst in the reaction of $CO+H_2O \rightarrow H_2+CO_2$, and it also serves as a water gas shift catalyst component.

Examples of a methanol dehydration catalyst component include γ-alumina, silica, silica-alumina and zeolite, which are acid-base catalysts. Examples of a metal oxide component in zeolite include alkali metal oxides such as sodium oxide and potassium oxide, and alkaline earth metal oxides such as calcium oxide and magnesium oxide.

Examples of a water gas shift catalyst component include copper oxide-zinc oxide, and iron oxide-chromium oxide. In a copper oxide-zinc oxide catalyst, a ratio of copper oxide to zinc oxide (copper oxide/zinc oxide; by weight) is about 0.1 to 20, more preferably about 0.5 to 10. In a iron oxide-chromium oxide catalyst, a ratio of chromium oxide to iron oxide (chromium oxide/iron oxide; by weight) is about 0.1 to 20, more preferably about 0.5 to 10. Examples of a water gas shift catalyst component which also serves as a methanol dehydration catalyst component include copper (including copper oxide)-alumina.

There are no restrictions to a ratio of a methanol synthesis catalyst component/a methanol dehydration catalyst component/a water gas shift catalyst component, which can be appropriately determined, depending on kinds of catalyst components, reaction conditions, and the like. Generally, a ratio of a methanol dehydration catalyst component to a methanol synthesis catalyst component (a methanol dehydration catalyst component/a methanol synthesis catalyst component; by weight) is about 0.1 to 5, more preferably about 0.2 to 2. A ratio of a water gas shift catalyst component to a methanol synthesis catalyst component (a water gas shift catalyst component/a methanol synthesis catalyst component; by weight) is about 0.2 to 5, more preferably about 0.5 to 3. When a methanol synthesis catalyst component also acts as a water gas shift catalyst component, it is preferable that the content of the methanol synthesis catalyst component is the sum of the above contents of the methanol synthesis catalyst component and of the water gas shift catalyst component.

A dimethyl ether synthesis catalyst is preferably a mixture of a methanol synthesis catalyst component, a methanol dehydration catalyst component and, if necessary, a water gas shift catalyst component. The mixture may be, if necessary, molded after mixing these catalyst components homogeneously. After molding, the resulting catalyst may be re-pulverized. The better catalyst performance may be achieved when using a catalyst obtained by mixing the catalyst components homogeneously, pressing the mixture, and then re-pulverizing the resulting catalyst.

When using a slurry type reactor, average particle sizes of a methanol synthesis catalyst component, a methanol dehydration catalyst component and a water gas shift catalyst component are preferably 300 μm or less, more preferably 1 to 200 μm, particularly preferably 10 to 150 μm.

The dimethyl ether synthesis catalyst may comprise an additive component as long as the intended effect would not be impaired.

In the dimethyl ether production process, dimethyl ether is produced by reacting carbon monoxide with hydrogen using the above dimethyl ether synthesis catalyst.

As described above, the reaction is preferably conducted in a slurry-bed type reactor.

When using a slurry type reactor, a dimethyl ether synthesis catalyst is used as a slurry catalyst wherein the dimethyl ether synthesis catalyst is dispersed in an oily medium as a solvent.

The oily medium is required to be kept in a liquid state stably under the reaction conditions. Examples of an oily medium include aliphatic, aromatic and alicyclic hydrocarbons, alcohols, ethers, esters, ketones and halides thereof. The oily medium may be used alone or in combination of two or more. A preferable oily medium is a medium consisting essentially of one or more hydrocarbons. A desulfurized light oil, a vacuum light oil, a high-boiling fraction of hydrogenated coal tar, a Fischer-Tropsch synthetic oil, and a high-boiling edible oil can be used as an oily medium.

The amount of the dimethyl ether synthesis catalyst to be used can be appropriately determined, depending on a kind of a solvent (oily medium) to be used, reaction conditions, and the like. Generally, the amount is preferably about 1 to 50 wt % to the solvent. The amount of the dimethyl ether synthesis catalyst to be used is more preferably 5 wt % or more, particularly preferably 10 wt % or more to the solvent. On the other hand, the amount of the dimethyl ether synthesis catalyst to be used is more preferably 40 wt % or less to the solvent.

A gas fed into a reactor preferably contains carbon monoxide and hydrogen at a ratio of $CO:H_2=1:0.5$ to $1:1.5$ (molar ratio). A ratio of hydrogen to carbon monoxide ($H_2/CO$; by mole) in a gas fed into a reactor is more preferably 0.8 or more, particularly preferably 0.9 or more. A ratio of hydrogen to carbon monoxide ($H_2/CO$; by mole) in a gas fed into a reactor is more preferably 1.2 or less, particularly preferably 1.1 or less.

A gas fed into a reactor may contain a component other than carbon monoxide and hydrogen.

When using a slurry type reactor, a reaction temperature is preferably 150 to 400° C., more preferably 200° C. or higher and 350° C. or lower. By controlling a reaction temperature within the above range, a higher conversion of carbon monoxide can be achieved.

A reaction pressure is preferably 1 to 30 MPa, more preferably 2 MPa or higher and 8 MPa or lower. By controlling a reaction pressure to be 1 MPa or higher, a higher conversion of carbon monoxide can be achieved. Meanwhile, in the light of economical efficiency, a reaction pressure is preferably 30 MPa or lower.

A space velocity (a feed rate of a starting gas in normal state per 1 kg of a catalyst) is preferably 100 to 50000 L/kg·h, more preferably 500 L/kg·h or higher and 30000 L/kg·h or lower. By controlling a space velocity to be 50000 L/kg·h or lower, a higher conversion of carbon monoxide can be achieved. Meanwhile, in the light of economical efficiency, a space velocity is preferably 100 L/kg·h or higher.

The dimethyl ether-containing gas thus produced generally comprises, in addition to dimethyl ether, carbon monoxide and hydrogen, which are unreacted starting materials, carbon dioxide, water, methanol and so on. A component other than methanol and dimethyl ether may be separated from the dimethyl ether-containing gas, as necessary. As described above, in this invention, when a gas fed into a reactor in a lower-paraffin production process contains carbon monoxide and/or carbon dioxide, the presence of carbon monoxide and/or carbon dioxide in the gas has no effect on LPG synthesis reaction. From this viewpoint, there is no need to separate carbon monoxide and/or carbon dioxide from the dimethyl ether-containing gas.

<Lower-Paraffin Production Process>

In the lower-paraffin production process, a lower-paraffin-containing gas, which contains propane or butane as a main component of hydrocarbons contained therein, and water, is produced from the methanol- and/or dimethyl ether-containing gas obtained in the above methanol-dimethyl ether production process, and the $H_2$-containing gas obtained in the above shift reaction process, by reacting at least one selected from the group consisting of methanol and dimethyl ether with hydrogen in the presence of a catalyst for producing a liquefied petroleum gas.

Examples of a catalyst for producing a liquefied petroleum gas include a catalyst in which an olefin-hydrogenation catalyst component is supported on a zeolite; and a catalyst comprising at least one methanol synthesis catalyst component and at least one zeolite catalyst component; specifically, a catalyst comprising a Cu—Zn-based methanol synthesis catalyst and a USY-type zeolite in a ratio of the Cu—Zn-based methanol synthesis catalyst:the USY-type zeolite 1:5 to 2:1 (by weight); a catalyst comprising a Cu—Zn-based methanol synthesis catalyst and β-zeolite in a ratio of the Cu—Zn-based methanol synthesis catalyst:the β-zeolite=1:5 to 2:1 (by weight); and a catalyst comprising a Pd-based methanol synthesis catalyst and a β-zeolite in a ratio of the Pd-based methanol synthesis catalyst:the β-zeolite=1:5 to 2.5:1 (by weight). Other examples of a catalyst for producing a liquefied petroleum gas include a catalyst comprising a hydrogenation catalyst such as Fe-supported catalyst, Co-supported catalyst and Ni-supported catalyst, and β-zeolite.

Herein, an "olefin-hydrogenation catalyst component" means a compound which can act as a catalyst in a hydrogenation reaction of an olefin into a paraffin. And a zeolite is those which can act as a catalyst in a condensation reaction of methanol into a hydrocarbon and/or a condensation reaction of dimethyl ether into a hydrocarbon.

And, herein, a "methanol synthesis catalyst component" means a compound which can act as a catalyst in the reaction of $CO+2H_2 \rightarrow CH_3OH$. And a "zeolite catalyst component" means a zeolite which can act as a catalyst in a condensation reaction of methanol into a hydrocarbon and/or a condensation reaction of dimethyl ether into a hydrocarbon. In the above catalyst comprising a methanol synthesis catalyst component and a zeolite catalyst component, the methanol synthesis catalyst component acts as an olefin-hydrogenation catalyst component.

In the lower-paraffin production process, paraffin containing propane or butane as a main component (LPG) may be produced from at least one selected from the group consisting of methanol and dimethyl ether, and hydrogen, following the formula (5) shown below.

(5)

In this invention, methanol is dehydrated to generate a carbene ($H_2C$:) by a concerted catalysis of an acidic site and a basic site, which are at a spatial field inside a pore in a zeolite catalyst component. And then, the carbene is polymerized to form an olefin containing propylene or butene as a main component. More specifically, it may be thought that ethylene is formed as a dimer; propylene is formed as a trimer or a reaction product with ethylene; and butylene is formed as a tetramer, a reaction product with propylene or a product of dimerization of ethylene.

In the olefin formation process, there would occur other reactions such as formation of dimethyl ether by dehydration-dimerization of methanol and formation of methanol by hydration of dimethyl ether.

And then, the formed olefin is hydrogenated by the catalysis of an olefin-hydrogenation catalyst component, to form a paraffin containing propane or butane as a main component, i.e., LPG.

For the above catalyst, any of Cu—Zn-based methanol synthesis catalysts known in the art can be used, and a commercially available Cu—Zn-based methanol synthesis catalyst can be used. Meanwhile, examples of a Pd-based methanol synthesis catalyst include a catalyst in which 0.1 to 10 wt % Pd is supported on a support such as silica; and a catalyst in which 0.1 to 10 wt % Pd and 5 wt % or less (excluding 0 wt %) at least one selected from the group consisting of alkali metals, alkaline earth metals and lanthanoid metals such as Ca are supported on a support such as silica.

A catalyst for producing a liquefied petroleum gas may be used alone or in combination of two or more. A catalyst for producing a liquefied petroleum gas may comprise other additive components as long as its intended effect would not be impaired. For example, any of the above catalysts may be diluted with quartz sand and then used.

When the reaction is conducted with a fixed bed, in the catalyst layer comprising a catalyst for producing a liquefied petroleum gas, the composition may change in regard to the direction of flowing of the starting gas. The catalyst layer may consist of, for example, a former catalyst layer comprising a zeolite catalyst component largely, and a latter catalyst layer comprising a methanol synthesis catalyst component which also acts as an olefin-hydrogenation catalyst component largely, in the direction of flowing of the starting gas.

Among them, a preferable catalyst for producing a liquefied petroleum gas is a catalyst in which an olefin-hydrogenation catalyst component is supported on a zeolite.

An olefin-hydrogenation catalyst component may be selected, without limitation, from those which can act as a catalyst in a hydrogenation reaction of an olefin into a paraffin. Specific examples of an olefin-hydrogenation catalyst component include Fe, Co, Ni, Cu, Zn, Ru, Rh, Pd, Ir, Pt and so on. The olefin-hydrogenation catalyst components may be used alone or in combination of two or more.

Among them, a preferable olefin-hydrogenation catalyst component is Pd or Pt, more preferably Pd. By using Pd and/or Pt as an olefin-hydrogenation catalyst component, the production amount of carbon monoxide and carbon dioxide as by-products can be more sufficiently reduced, while maintaining a high yield of propane and butane.

Pd and Pt may not be necessarily contained as a metal, but can be contained in the form of an oxide, a nitrate, a chloride or the like. In such a case, it is preferred that the catalyst may be subjected to, for example, reduction by hydrogen before the reaction, to convert Pd and/or Pt into metallic palladium and/or metallic platinum, for achieving higher catalytic activity.

The reduction treatment condition for activating Pd and/or Pt can be determined, depending on some factors such as the types of a supported palladium compound and/or a supported platinum compound, as appropriate.

In the light of catalytic activity, an olefin-hydrogenation catalyst component such as Pd and Pt is preferably supported on a zeolite in a highly dispersed manner.

When a catalyst for producing a liquefied petroleum gas is a catalyst in which an olefin-hydrogenation catalyst component is supported on a zeolite, the total amount of the supported olefin-hydrogenation catalyst component in the catalyst is preferably 0.005 wt % or more, more preferably 0.01 wt % or more, particularly preferably 0.05 wt % or more. On the other hand, when a catalyst for producing a liquefied petroleum gas is a catalyst in which an olefin-hydrogenation catalyst component is supported on a zeolite, the total amount of the supported olefin-hydrogenation catalyst component in the catalyst is preferably 5 wt % or less, more preferably 1 wt % or less, particularly preferably 0.7 wt % or less, in the light of dispersibility and economical efficiency. By adjusting the amount of a supported olefin-hydrogenation catalyst component in a catalyst for producing a liquefied petroleum gas within the above range, propane and/or butane can be produced with a higher conversion, a higher selectivity and a higher yield.

By adjusting the amount of a supported olefin-hydrogenation catalyst component to be 0.005 wt % or more, more preferably 0.01 wt % or more, particularly preferably 0.05 wt % or more, methanol and/or dimethyl ether can be converted into a liquefied petroleum gas containing propane or butane as a main component with a higher selectivity. On the other hand, by adjusting the amount of a supported olefin-hydrogenation catalyst component to be 5 wt % or less, more preferably 1 wt % or less, particularly preferably 0.7 wt % or less, a higher catalytic activity can be achieved.

A zeolite, on which an olefin-hydrogenation catalyst component is supported, may be selected, without limitation, from zeolites which can act as a catalyst in a condensation reaction of methanol into a hydrocarbon and/or a condensation reaction of dimethyl ether into a hydrocarbon, and a commercially available zeolite can be used. Examples of such a zeolite include ZSM-5, β-zeolite and USY-type zeolite. Such zeolites may be used alone or in combination of two or more.

It is important to use a zeolite having a suitable acid strength, a suitable acidity (acid concentration) and a suitable pore size as a zeolite on which an olefin-hydrogenation catalyst component is supported. A Si/Al ratio (atomic ratio) of a zeolite is also important. Furthermore, other factors such as a pore structure and a crystal size may be also important.

Among them, ZSM-5 is preferable as a zeolite, on which an olefin-hydrogenation catalyst component is supported. By using ZSM-5, a higher catalytic activity and a higher yield of propane and butane can be achieved, and furthermore the production amount of carbon monoxide and carbon dioxide as by-products can be more sufficiently reduced.

A preferable ZSM-5, on which an olefin-hydrogenation catalyst component is supported, is high-silica ZSM-5, more specifically ZSM-5 with a Si/Al ratio (atomic ratio) of 20 to 100. By using ZSM-5 with a Si/Al ratio (atomic ratio) of 20 to 100, a higher catalytic activity and a higher yield of propane and butane can be achieved, and furthermore the production amount of carbon monoxide and carbon dioxide as by-products can be more sufficiently reduced. A Si/Al ratio (atomic ratio) of ZSM-5 is more preferably 70 or less, particularly preferably 60 or less.

A particularly preferable catalyst for producing a liquefied petroleum gas used in this invention is Pd and/or Pt supported ZSM-5, more preferably Pd supported ZSM-5.

In this catalyst for producing a liquefied petroleum gas, the total amount of supported Pd and/or Pt is preferably 0.005 wt % or more, more preferably 0.01 wt % or more, particularly preferably 0.05 wt % or more. And, the total amount of supported Pd and/or Pt is preferably 5 wt % or less, more preferably 1 wt % or less, particularly preferably 0.7 wt % or less.

The above catalyst for producing a liquefied petroleum gas may be a catalyst in which other components, in addition to an olefin-hydrogenation catalyst component, are supported on a zeolite, as long as the desired effects of the catalyst would not be impaired.

A catalyst for producing a liquefied petroleum gas in which an olefin-hydrogenation catalyst component is supported on a zeolite can be prepared by a known method such as an ion exchange method and an impregnation method. Sometimes, in comparison with a catalyst for producing a liquefied petroleum gas prepared by an impregnation method, a catalyst for producing a liquefied petroleum gas prepared by an ion exchange method may exhibit a higher catalytic activity, and thus may allow an LPG production reaction to proceed at a lower reaction temperature, and a higher selectivity for a hydrocarbon and a higher selectivity for propane and butane may be achieved.

A catalyst in which an olefin-hydrogenation catalyst component is supported on zeolite may be used, if necessary, after pulverization or molding. A molding method of a catalyst is not particularly limited, but is preferably a dry method including an extrusion and a tablet-compression.

A catalyst for producing a liquefied petroleum gas may comprise other additive components as long as its intended effect would not be impaired.

In the lower-paraffin production process, a paraffin comprising propane or butane, preferably propane, as a main component is produced by reacting at least one selected from the group consisting of methanol and dimethyl ether with hydrogen using at least one of the catalysts for producing a liquefied petroleum gas as described above.

A reaction raw material may be methanol or dimethyl ether alone, or may be a mixture of methanol and dimethyl ether. When using a mixture of methanol and dimethyl ether as a reaction raw material, a ratio of methanol to dimethyl ether is not particularly limited, and can be appropriately determined.

The reaction can be conducted in a fixed bed, a fluidized bed or a moving bed. The reaction conditions such as a composition of a starting gas, a reaction temperature, a reaction pressure and a contact time with a catalyst can be appropriately determined, depending on a kind of a catalyst to be used, and the like. For example, the LPG production reaction may be carried out under the following conditions.

A gas fed into a reactor comprises the methanol- and/or dimethyl ether-containing gas obtained in the above methanol-dimethyl ether production process, and the $H_2$-containing gas obtained in the above shift reaction process.

When a reaction raw material is methanol, a content of hydrogen in a gas fed into a reactor is preferably 1 mole or more, more preferably 1.2 moles or more per 1 mole of methanol, in the light of improving a hydrogenation rate and reducing deterioration of a catalyst. In the light of productivity and economical efficiency, a content of hydrogen in a gas fed into a reactor is preferably 3 moles or less, more preferably 2 moles or less per 1 mole of methanol.

When a reaction raw material is dimethyl ether, a content of hydrogen in a gas fed into a reactor is preferably 2 mole or more, more preferably 2.5 moles or more per 1 mole of dimethyl ether, in the light of improving a hydrogenation rate and reducing deterioration of a catalyst. In the light of productivity and economical efficiency, a content of hydrogen in a gas fed into a reactor is preferably 5 moles or less, more preferably 4 moles or less per 1 mole of dimethyl ether.

When a reaction raw material is a mixture of methanol and dimethyl ether, a content of hydrogen in a gas fed into a reactor is preferably within the same range as the above preferable range when a reaction raw material is methanol and the above preferable range when a reaction raw material is dimethyl ether. And, this preferable range can be calculated based on a ratio of methanol to dimethyl ether.

A gas fed into a reactor may contain water, an inert gas and the like, in addition to at least one selected from the group consisting of methanol and dimethyl ether, which are reaction raw materials, and hydrogen. The gas fed into a reactor may contain carbon monoxide and/or carbon dioxide.

The methanol- and/or dimethyl ether-containing gas and the $H_2$-containing gas may be mixed, and then fed to a reactor or, alternatively, these may be fed to a reactor separately.

In the light of achieving a higher catalytic activity, a reaction temperature is preferably 300° C. or higher, more preferably 320° C. or higher. In the light of achieving a higher selectivity for a hydrocarbon and a higher selectivity for propane and butane, as well as a long catalyst life, a reaction temperature is preferably 470° C. or lower, more preferably 450° C. or lower, particularly preferably 400° C. or lower.

In the light of achieving a higher activity and good operability of an apparatus, a reaction pressure is preferably 0.1 MPa or higher, more preferably 0.15 MPa or higher. In the light of economical efficiency and safety, a reaction pressure is preferably 3 MPa or lower, more preferably 2.5 MPa or lower, particularly preferably lower than 2 MPa, further preferably 1.5 MPa or lower. Moreover, by controlling a reaction pressure to be 2.5 MPa or lower, more preferably 1.5 MPa or lower, the production amount of carbon monoxide and carbon dioxide as by-products can be more sufficiently reduced.

Furthermore, according to this invention, LPG can be produced under a further lower pressure. Specifically, LPG can be produced from at least one selected from the group consisting of methanol and dimethyl ether, and hydrogen under a pressure of lower than 1 MPa, particularly 0.6 MPa or lower.

A gas space velocity is preferably 1500 $hr^{-1}$ or more, more preferably 1800 $hr^{-1}$ or more, in the light of economical efficiency. In addition, a gas space velocity is preferably 60000 $hr^{-1}$ or less, more preferably 30000 $hr^{-1}$ or less, in the light of achieving a higher activity and a higher selectivity for propane and butane.

A gas fed into a reactor can be dividedly fed to the reactor so as to control a reaction temperature.

The reaction can be conducted in a fixed bed, a fluidized bed, a moving bed or the like, and can be preferably selected, taking both of control of a reaction temperature and a regeneration method of the catalyst into account. For example, a fixed bed may include a quench type reactor such as an internal multistage quench type, a multitubular type reactor, a multistage type reactor having a plurality of internal heat exchangers or the like, a multistage cooling radial flow type, a double pipe heat exchange type, an internal cooling coil type, a mixed flow type, and other types of reactors.

When used, a catalyst for producing a liquefied petroleum gas can be diluted with silica, alumina or an inert and stable heat conductor for controlling a temperature. In addition, when used, a catalyst for producing a liquefied petroleum gas can be applied to the surface of a heat exchanger for controlling a temperature.

A reaction product gas thus produced (a lower-paraffin-containing gas) comprises a hydrocarbon containing propane or butane as a main component. In the light of liquefaction properties, it is preferable that the total content of propane and butane is higher in a lower-paraffin-containing gas. Furthermore, a lower-paraffin-containing gas produced preferably contains more propane in comparison with butane, in the light of inflammability and vapor pressure properties.

The lower-paraffin-containing gas produced comprises water, in addition to paraffins. The lower-paraffin-containing gas produced may comprise carbon monoxide and carbon dioxide; hydrogen, methanol and dimethyl ether, which are unreacted starting materials; ethane, methane and high-boiling paraffins (e.g., pentane, hexane and so on), which are by-products; and so on.

<$H_2O$ Separation Process>

In the $H_2O$ separation process, a $H_2O$-containing gas, which contains water as a main component, and, if necessary, other components are separated from the lower-paraffin-containing gas obtained in the above lower-paraffin production process, to obtain a liquefied petroleum gas containing propane or butane as a main component (LPG). If necessary, the gas may be pressurized and/or cooled so as to obtain a liquefied petroleum gas.

Separation of the $H_2O$-containing gas can be conducted in accordance with a known method. The $H_2O$-containing gas can be separated by, for example, liquid-liquid separation, and gas-liquid separation with cooling.

The separation conditions may be determined as appropriate in accordance with a known method.

The $H_2O$-containing gas may contain a component other than water. A component other than water may be also separated from the $H_2O$-containing gas which is separated from the lower-paraffin-containing gas, as necessary.

The lower-paraffin-containing gas obtained in the above lower-paraffin production process generally comprises, in addition to propane, butane and water, a low-boiling component having a lower boiling point or a lower sublimation point than the boiling point of propane; and a high-boiling component having a higher boiling point than the boiling point of butane. Examples of a low-boiling component include hydrogen, which is an unreacted starting material; ethane and methane, which are by-products; and carbon monoxide and carbon dioxide. Examples of a high-boiling component include high-boiling paraffins (e.g., pentane, hexane and so on), which are by-products.

Thus, before or after separating the $H_2O$-containing gas, a low-boiling component and a high-boiling component are, as necessary, separated from a lower-paraffin-containing gas produced, so as to obtain a liquefied petroleum gas (LPG) comprising propane or butane as a main component.

Separation of a low-boiling component or a high-boiling component can be conducted in accordance with a known method.

A low-boiling component can be separated by, for example, gas-liquid separation, absorption separation or distillation; more specifically, gas-liquid separation at an ambient temperature under increased pressure, absorption separation at an ambient temperature under increased pressure, gas-liquid separation with cooling, absorption separation with cooling, or combination thereof. Alternatively, for this purpose, membrane separation or adsorption separation can be conducted, or these in combination with gas-liquid separation, absorption separation or distillation can be conducted. A gas recovery process commonly employed in an oil factory (described in "Oil Refining Processes", ed. The Japan Petroleum Institute, Kodansha Scientific, 1998, pp. 28-32) can be applied to separation of a low-boiling component.

A preferable method of separation of a low-boiling component is an absorption process where a liquefied petroleum gas comprising propane or butane as a main component is absorbed into an absorbent liquid such as a high-boiling paraffin gas having a higher boiling point than butane, and a gasoline.

A high-boiling component can be separated by, for example, gas-liquid separation, absorption separation or distillation.

The separation conditions may be determined as appropriate in accordance with a known method.

For consumer use, it is preferable that a content of a low-boiling component in the LPG is reduced to 5 mol % or less (including 0 mol %) by separation, for example, in the light of safety in use.

If necessary, methanol and/or dimethyl ether, which are unreacted starting materials, are also separated from a lower-paraffin-containing gas by a known method.

If necessary, the gas may be pressurized and/or cooled so as to obtain a liquefied petroleum gas.

The components separated from the lower-paraffin-containing gas can be removed outside the system, and can be recycled to any process as described above. For example, carbon monoxide and hydrogen separated in this step can be recycled as a starting material for the methanol-dimethyl ether production process. Methanol, dimethyl ether and hydrogen separated in this step can be recycled as a starting material for the lower-paraffin production process.

For the purpose of recycling a separated component, a known technique, e.g., appropriately providing a recycle line with a pressurization means can be employed.

The total content of propane and butane in the LPG thus produced may be 90% or more, more preferably 95% or more (including 100%) on the basis of carbon. And a content of propane in the LPG produced may be 50% or more, more preferably 60% or more, particularly preferably 65% or more (including 100%) on the basis of carbon. Thus, according to this invention, LPG having a composition suitable for a propane gas, which is widely used as a fuel for household and business use, can be produced.

<Recycling Process>

In the recycling process, the $H_2O$-containing gas separated from the lower-paraffin-containing gas in the above $H_2O$ separation process is recycled to the above shift reaction process.

The whole of $H_2O$-containing gas separated from the lower-paraffin-containing gas can be recycled to the shift reaction process. Alternatively, part of the $H_2O$-containing gas may be removed outside the system, while the rest of $H_2O$-containing gas may be recycled to the shift reaction process. The $H_2O$-containing gas can be recycled to the shift reaction process after separating only one desired component, i.e., water.

For the purpose of recycling the $H_2O$-containing gas, a known technique, e.g., appropriately providing a recycle line with a pressurization means can be employed.

Thus, according to this invention, LPG is produced from a carbon-containing starting material such as a coal, via a synthesis gas, and methanol and/or dimethyl ether.

INDUSTRIAL APPLICABILITY

As described above, according to this invention, a hydrocarbon containing propane or butane as a main component, i.e., a liquefied petroleum gas (LPG) can be economically produced from a carbon-containing starting material such as a coal, via a synthesis gas, and methanol and/or dimethyl ether.

What is claimed is:

1. A process for producing a liquefied petroleum gas, comprising:
(i) a step of producing a synthesis gas wherein a synthesis gas, which contains carbon monoxide and hydrogen, is produced from a carbon-containing starting material and at least one selected from the group consisting of $H_2O$, $O_2$ and $CO_2$;

(ii) a step of separating CO wherein a CO-containing gas, which contains carbon monoxide as a main component, and a gas for producing methanol and/or dimethyl ether, which contains carbon monoxide and hydrogen, are separated from the synthesis gas obtained in the step of producing a synthesis gas;

(iii) a step of conducting a shift reaction wherein a $H_2$-containing gas, which contains hydrogen, is produced from the CO-containing gas separated in the step of separating CO and the $H_2O$-containing gas recycled from the step of recycling by a shift reaction;

(iv) a step of producing methanol and/or dimethyl ether wherein a methanol- and/or dimethyl ether-containing gas, which contains at least one selected from the group consisting of methanol and dimethyl ether, is produced from the gas for producing methanol and/or dimethyl ether obtained in the step of separating CO by reacting carbon monoxide with hydrogen in the presence of a catalyst;

(v) a step of producing a lower-paraffin wherein a lower-paraffin-containing gas, which contains propane or butane as a main component of hydrocarbons contained therein, and water, is produced from the methanol- and/or dimethyl ether-containing gas obtained in the step of producing methanol and/or dimethyl ether and the $H_2$-containing gas obtained in the step of conducting a shift reaction by reacting at least one selected from the group consisting of methanol and dimethyl ether with hydrogen in the presence of a catalyst for producing a liquefied petroleum gas;

(vi) a step of separating $H_2O$ wherein a $H_2O$-containing gas, which contains water as a main component, and a liquefied petroleum gas, which contains propane or butane as a main component, are separated from the lower-paraffin-containing gas obtained in the step of producing a lower-paraffin; and (vii) a step of recycling wherein the $H_2O$-containing gas separated in the step of separating $H_2O$ is recycled to the step of conducting a shift reaction.

2. A process for producing a liquefied petroleum gas, comprising:

(i) a step of producing a synthesis gas wherein a synthesis gas, which contains carbon monoxide and hydrogen, is produced from a carbon-containing starting material and at least one selected from the group consisting of $H_2O$, $O_2$ and $CO_2$;

(ii) a step of separating CO wherein a CO-containing gas, which contains carbon monoxide as a main component, and a gas for producing methanol, which contains carbon monoxide and hydrogen, are separated from the synthesis gas obtained in the step of producing a synthesis gas;

(iii) a step of conducting a shift reaction wherein a $H_2$-containing gas, which contains hydrogen, is produced from the CO-containing gas separated in the step of separating CO and the $H_2O$-containing gas recycled from the step of recycling by a shift reaction;

(iv) a step of producing methanol wherein a methanol-containing gas is produced from the gas for producing methanol obtained in the step of separating CO by reacting carbon monoxide with hydrogen in the presence of a catalyst for producing methanol;

(v) a step of producing a lower-paraffin wherein a lower-paraffin-containing gas, which contains propane or butane as a main component of hydrocarbons contained therein, and water, is produced from the methanol-containing gas obtained in the step of producing methanol and the $H_2$-containing gas obtained in the step of conducting a shift reaction by reacting methanol with hydrogen in the presence of a catalyst for producing a liquefied petroleum gas;

(vi) a step of separating $H_2O$ wherein a $H_2O$-containing gas, which contains water as a main component, and a liquefied petroleum gas, which contains propane or butane as a main component, are separated from the lower-paraffin-containing gas obtained in the step of producing a lower-paraffin; and (vii) a step of recycling wherein the $H_2O$-containing gas separated in the step of separating $H_2O$ is recycled to the step of conducting a shift reaction.

3. A process for producing a liquefied petroleum gas according to claim 2, wherein the content of hydrogen in the gas for producing methanol is 1.5 to 2.5 mole per 1 mole of carbon monoxide.

4. A process for producing a liquefied petroleum gas according to claim 2, wherein in the step of producing a lower-paraffin, the methanol-containing gas and the $H_2$-containing gas are mixed such that the content of hydrogen is 1 to 3 mole per 1 mole of methanol.

5. A process for producing a liquefied petroleum gas, comprising:

(i) a step of producing a synthesis gas wherein a synthesis gas, which contains carbon monoxide and hydrogen, is produced from a carbon-containing starting material and at least on C selected from the group consisting of $H_2O$, $O_2$ and $CO_2$;

(ii) a step of separating CO wherein a CO-containing gas, which contains carbon monoxide as a main component, and a gas for producing dimethyl ether, which contains carbon monoxide and hydrogen, are separated from the synthesis gas obtained in the step of producing a synthesis gas;

(iii) a step of conducting a shift reaction wherein a $H_2$-containing gas, which contains hydrogen, is produced from the CO-containing gas separated in the step of separating CO and the $H_2O$-containing gas recycled from the step of recycling by a shift reaction;

(iv) a step of producing dimethyl ether wherein a dimethyl ether-containing 2 as is produced from the gas for producing dimethyl ether obtained in the step of separating CO by reacting carbon monoxide with hydrogen in the presence of a catalyst for producing dimethyl ether;

(v) a step of producing a lower-paraffin wherein a lower-paraffin-containing gas, which contains propane or butane as a main component of hydrocarbons contained therein, and water, is produced from the dimethyl ether-containing gas obtained in the step of producing dimethyl ether and the $H_2$-containing gas obtained in the step of conducting a shift reaction by reacting dimethyl ether with hydrogen in the presence of a catalyst for producing a liquefied petroleum gas;

(vi) a step of separating $H_2O$ wherein a $H_2O$-containing gas, which contains water as a main component, and a liquefied petroleum gas, which contains propane or butane as a main component, are separated from the lower-paraffin-containing gas obtained in the step of producing a lower-paraffin; and (vii) a step of recycling wherein the $H_2O$-containing gas separated in the step of separating $H_2O$ is recycled to the step of conducting a shift reaction.

6. A process for producing a liquefied petroleum gas according to claim 5, wherein the content of hydrogen in the gas for producing dimethyl ether is 0.5 to 1.5 mole per 1 mole of carbon monoxide.

7. A process for producing a liquefied petroleum gas according to claim 5, wherein in the step of producing a lower-paraffin, the dimethyl ether-containing gas and the $H_2$-containing gas are mixed such that the content of hydrogen is 2 to 5 mole per 1 mole of dimethyl ether.

8. A process for producing a liquefied petroleum gas according to claim 2, wherein in the step of producing a synthesis gas, the synthesis gas is produced by coal gasification or biomass gasification.

9. A process for producing a liquefied petroleum gas according to claim 5, wherein in the step of producing a synthesis gas, the synthesis oas is produced by coal gasification or biomass gasification.

* * * * *

UNITED STATES PATENT AND TRADEMARK OFFICE
CERTIFICATE OF CORRECTION

PATENT NO. : 7,728,046 B2
APPLICATION NO. : 11/573243
DATED : June 1, 2010
INVENTOR(S) : Kaoru Fujimoto et al.

It is certified that error appears in the above-identified patent and that said Letters Patent is hereby corrected as shown below:

Column 8, Line 27, change "inventions" to --invention,--.

Column 9, Line 55, change "$CO:H_2 1:1.5$" to --$CO:H_2=1:1.5$--.

Column 16, Line 6, change "zeolite 1:5" to --zeolite=1:5--.

Column 22, Line 10, change "components" to --component(s)--.

Column 24, Line 31, change "on C" to --one--.

Column 24, Line 46, change "2 as" to --gas--.

Column 26, Line 7, change "oas" to --gas--.

Signed and Sealed this
Twenty-seventh Day of September, 2011

David J. Kappos
*Director of the United States Patent and Trademark Office*